United States Patent
Bruno et al.

(10) Patent No.: US 10,476,756 B2
(45) Date of Patent: Nov. 12, 2019

(54) TIME AWARE PATH COMPUTATION

(71) Applicant: Telefonaktiebolaget LM Ericsson (publ), Stockholm (SE)

(72) Inventors: Gianmarco Bruno, Genoa (IT); Daniele Ceccarelli, Stockholm (SE); Francesco Lazzeri, Genoa (IT); Jeroen Nijhof, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/546,541

(22) PCT Filed: Feb. 3, 2015

(86) PCT No.: PCT/EP2015/052197
§ 371 (c)(1),
(2) Date: Jul. 26, 2017

(87) PCT Pub. No.: WO2016/124228
PCT Pub. Date: Aug. 11, 2016

(65) Prior Publication Data
US 2018/0019930 A1    Jan. 18, 2018

(51) Int. Cl.
*H04L 12/24* (2006.01)
*H04L 12/733* (2013.01)
(Continued)

(52) U.S. Cl.
CPC ............ *H04L 41/147* (2013.01); *H04L 45/20* (2013.01); *H04L 45/42* (2013.01); *H04L 47/823* (2013.01); *H04L 47/827* (2013.01)

(58) Field of Classification Search
None
See application file for complete search history.

(56) References Cited

U.S. PATENT DOCUMENTS

| 5,745,694 A | 4/1998 | Egawa et al. |
| 8,824,274 B1 | 9/2014 | Medved et al. |

(Continued)

FOREIGN PATENT DOCUMENTS

| WO | WO 2009/025329 A1 | 2/2009 |
| WO | 2013 188779 A1 | 12/2013 |

OTHER PUBLICATIONS

Fatai Zhang et al.; Applicability of Stateful Path Computation Element (PCE); Network Working Group; Internet-Draft; Intended status: Informational—Expires: Sep. 5, 2012.

(Continued)

*Primary Examiner* — Anh Vu H Ly
(74) *Attorney, Agent, or Firm* — Baker Botts, LLP

(57) ABSTRACT

A path computation method involves receiving (200) a request for computation of a new path in the network, the request indicating a future time interval when the path is desired. Subsequently a future network status is generated (210, 212, 214), having a representation of availability of path resources at the future time interval, based on selected paths already reserved at that future time interval. Then there is a step of computing (220) which of the path resources to select for the new path according to the future network status. By generating this future network status when the future time interval is known, it can be generated in respect of a limited time interval rather than covering all possible future reservable times. Thus the benefits of time aware path computation can be achieved without the need for maintaining a huge database of availability at all future times, of all the path resources.

15 Claims, 11 Drawing Sheets

(51) Int. Cl.
*H04L 12/717* (2013.01)
*H04L 12/911* (2013.01)

(56) References Cited

U.S. PATENT DOCUMENTS

| | | | | |
|---|---|---|---|---|
| 8,897,306 B2* | 11/2014 | Hayashi | ................. | H04L 45/00 |
| | | | | 370/395.4 |
| 2010/0220996 A1* | 9/2010 | Lee | ................. | H04J 14/0227 |
| | | | | 398/25 |
| 2011/0211445 A1* | 9/2011 | Chen | ................. | H04L 45/42 |
| | | | | 370/221 |
| 2011/0292949 A1 | 12/2011 | Hayashi et al. | | |
| 2012/0207467 A1* | 8/2012 | Lee | ................. | H04J 14/0257 |
| | | | | 398/16 |
| 2013/0007266 A1* | 1/2013 | Jocha | ................. | H04L 45/00 |
| | | | | 709/224 |
| 2013/0336109 A1* | 12/2013 | Previdi | ................. | H04L 43/16 |
| | | | | 370/229 |
| 2013/0336126 A1* | 12/2013 | Vasseur | ................. | H04L 41/147 |
| | | | | 370/236 |
| 2014/0328587 A1* | 11/2014 | Magri | ................. | H04L 45/62 |
| | | | | 398/26 |
| 2015/0089081 A1* | 3/2015 | Thubert | ................. | H04L 45/12 |
| | | | | 709/239 |
| 2015/0103844 A1* | 4/2015 | Zhao | ................. | H04L 45/42 |
| | | | | 370/410 |
| 2015/0249593 A1* | 9/2015 | Alvarez | ................. | H04L 41/0803 |
| | | | | 370/241 |
| 2016/0127223 A1* | 5/2016 | Kern | ................. | H04L 45/02 |
| | | | | 370/225 |

OTHER PUBLICATIONS

K. Manousakis et al.; A Bandwidth Monitoring Mechanism Enhancing SNMP to Record Timed Reservations; Resource Journal of Network and Systems Management, vol. 14, No. 4—Dec. 2006.
Dr. Mohammed F. Al Ajmi et al.; Cloud Computing Utilization for E-Learning Pharmaceutical System; International Journal of Scientific & Technology Research vol. 3, Issue 3—Mar. 2014.
Optical Transport Use Cases; Open Networking Foundation; Optical Transport Working Group; ONF TR-509—2014.
International Search Report for International application No. PCT/EP2015/052197—dated May 27, 2015.
Japanese Patent office, First Office Action, Patent Application 2017-540816 (with translation), dated Oct. 2, 2018.

* cited by examiner

TIME AWARE PATH COMPUTATION

PRIORITY

This nonprovisional application is a U.S. National Stage Filing under 35 U.S.C. § 371 of International Patent Application Serial No. PCT/EP2015/052197 filed Feb. 3, 2015, and entitled "Time Aware Path Computation."

TECHNICAL FIELD

The present invention relates to methods of path computation, to apparatus for path computation and to programs for carrying out such methods.

BACKGROUND

It is known to provide communications networks having path computation elements (PCE) for computing which path resources (for example links, nodes, frequency or time slots) to select for a new path through the network. A PCE has been defined as an entity (component, application, or network node) that is capable of computing a network path or route based on a network graph and applying computational constraints. A Path Computation Client (PCC) is any entity which requests a path computation to be performed by the PCE. The PCC and PCE in a typical example communicate through the PCE communication Protocol (PCEP). PCEP operations have been defined to enable effective PCE-based path computations and, in turn, the effective use of network resources. A PCE-based architecture is described in Internet Engineering Task Force (IETF) document RFC 4655 and the PCE communication Protocol is described in RFC 4657.

WO2013188779 shows a stateful path computation element (PCE) in a computer network which receives one or more path computation requests (PCReqs), and records a time of each PCReq and the corresponding requested bandwidth. Based on this information, the PCE may determine a traffic profile of the computer network, and may augment a traffic engineering database (TED) with requested bandwidth according to time based on the traffic profile. As such, prior to a particular time, the PCE may determine placement of tunnels within the traffic profile for the particular time.

SUMMARY

Embodiments of the invention provide improved methods and apparatus. According to a first aspect of the invention, there is provided a path computation method for use in a communications network having path resources usable for implementing paths, by receiving a request for computation of a new path in the network indicating a future time interval when the new path is desired, and subsequently generating a future network status. This has at least a representation of availability of respective ones of the path resources at the future time interval, the generating step being based on a selection from a log of paths already reserved, represented in terms of path resource reservations for each respective reserved path. At least some of the path resource reservations have an associated time interval, and the selection comprises at least those of the reserved paths whose associated time interval corresponds to the future time interval. Then the method involves computing which of the path resources to select for the new path according to the future network status.

Any additional features can be added or disclaimed, and some are described below and set out in dependent claims.

One such additional feature is the step of generating the future network status having the step of deriving values of availability for respective ones of the path resources with reduced time resolution than a resolution provided in the associated time of resource reservation in the log.

Another such additional feature is the generating step having the step of accumulating for each path resource the reservations in respect of that path resource, from the selected paths, and determining an availability from the accumulated reservations.

Another such additional feature is a step of selecting from the log the reserved paths having path resource reservations at the future time interval by a path computation element, the step of generating the future network status and the step of computing the new path also being carried out by the path computation element.

Another such additional feature is a step of updating the log of paths already reserved, and carried out by the path computation element.

Another such additional feature is a step of using a path computation client to select the paths in the log which have path resource reservations at the future time interval, and to send path reservation requests for the selected paths to a path computation element, to enable the path computation element to generate the future network status at the future time interval, and the path computation element being configured to carry out the step of computing the new path.

Another such additional feature is a subsequent step of generating a future network status for a different time interval, by detecting, from the log, differences in path resource reservations compared to those at the future time interval, and making corresponding changes to the representation of availability of respective ones of the path resources according to the differences.

Another such additional feature is the paths being label switched paths.

Another such additional feature is the network having a software defined network controller, the steps of receiving the request, subsequently generating the future network status, and computing the new path being carried out by the software defined network controller, with the path resources being represented as abstracted versions of actual path resources.

Another aspect of the invention provides a path computation method for use in a communications network having path resources usable for implementing paths, the method having steps of receiving a request for computation of a new path in the network, the request indicating a future time interval when the path is desired, making a selection from a log of paths already reserved represented in terms of path resource reservations for each respective reserved path. At least some of the path resource reservations have an associated time interval, and the selection comprises at least those of the reserved paths whose associated time interval corresponds to the future time interval. Then the selected paths are sent as reservation requests to a path computation element, to enable the path computation element to generate a future network status at the future time having at least a representation of availability of the path resources at the future time. Then the new path request is sent to the path computation element to enable the path computation element to compute which path resources to select for the new path according to the future network status.

Another aspect provides apparatus for path computation in a communications network having path resources usable for implementing paths, the apparatus having an interface arranged to receive a request for computation of a new path in the network, the request indicating a future time interval when the new path is desired and having a processor configured to generate a future network status. The future network status has at least a representation of availability of respective ones of the path resources at the future time interval. The generating is based on a selection from a log of paths already reserved represented in terms of path resource reservations for each respective reserved path, at least some of the path resource reservations having an associated time interval. The selection comprises at least those of the reserved paths whose associated time interval corresponds to future time interval, and the processor is configured to compute which of the path resources to select for the new path according to the future network status.

An additional feature of some embodiments is the processor comprising a path computation element also being configured to select from the log the reserved paths having path resource reservations at the indicated future time interval.

Another such additional feature is the path computation element being arranged to update the log of paths already reserved.

Another such additional feature is a path computation client to select the paths in the log which have path resource reservations at the future time interval, and to send the selected paths as reservation requests to the path computation element, to enable the path computation element to carry out the step of generating the future network status.

Another aspect provides apparatus for path computation in a communications network having path resources for implementing paths, the apparatus having: an interface for receiving a request for computation of a new path in the network, the request indicating a future time interval when the new path is desired and a processor configured to make a selection from a log of paths already reserved represented in terms of path resource reservations for each respective reserved path. At least some of the path resource reservations have an associated time interval, and the selection comprises at least those of the reserved paths whose associated time interval corresponds to the future time interval. The processor is also configured to send the selected paths as reservation requests to a path computation element, to enable the path computation element to generate the future network status at the future time interval, and to send the request to the path computation element to enable the path computation element to compute which path resources to select for the new path.

Another aspect provides a non transitory machine readable medium having instructions stored thereon which when executed by a processor cause the processor to carry out a path computation method as set out in any of the above mentioned methods.

Any of the additional features can be combined together and combined with any of the aspects. Other effects and consequences will be apparent to those skilled in the art, especially over compared to other prior art. Numerous variations and modifications can be made without departing from the claims of the present invention.

BRIEF DESCRIPTION OF THE DRAWINGS

How the present invention may be put into effect will now be described by way of example with reference to the appended drawings, in which.

DETAILED DESCRIPTION

Figure 1:
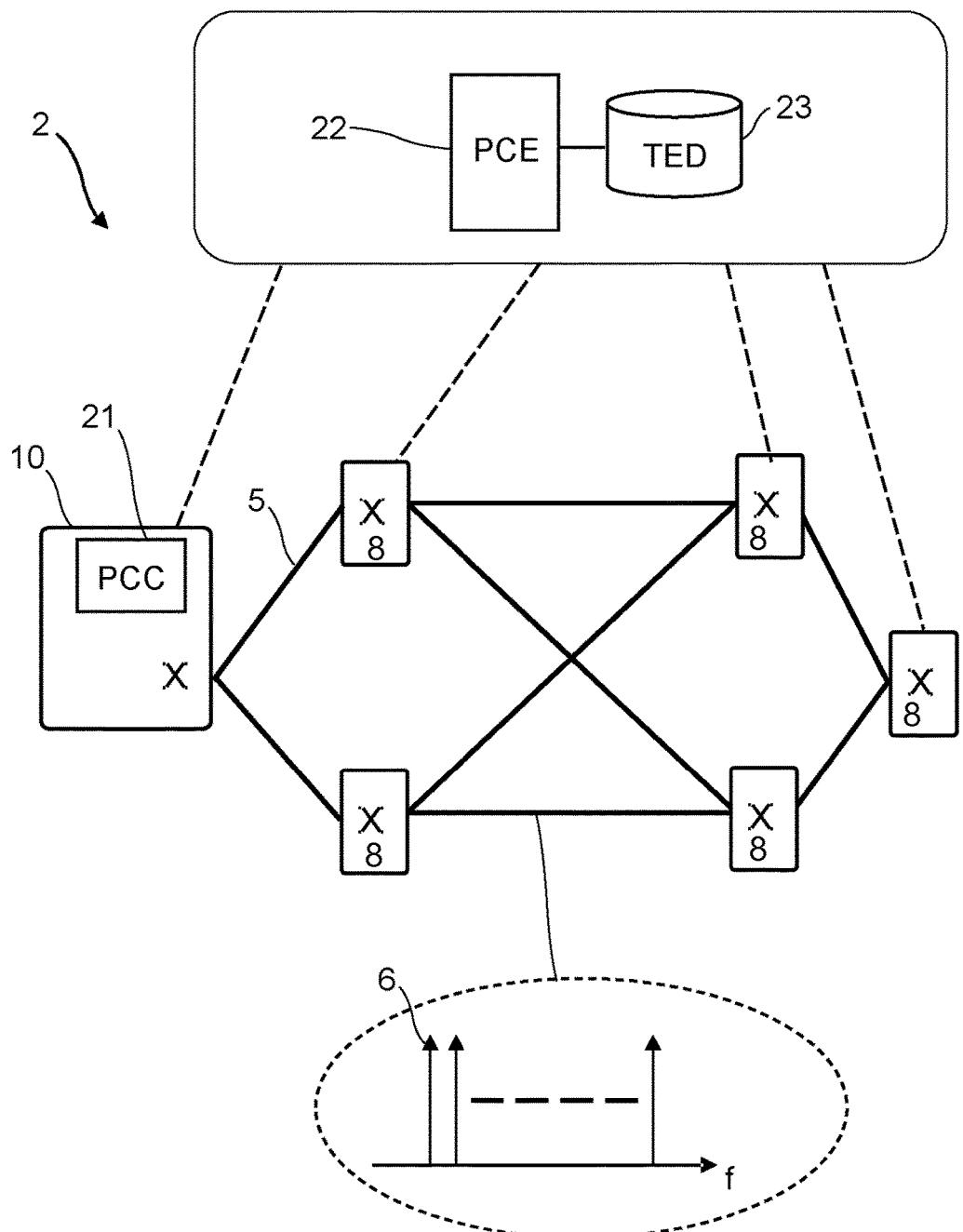
FIG. 1 shows a schematic view of a network having a PCE.

The present invention will be described with respect to particular embodiments and with reference to certain drawings but the scope of the invention is not limited thereto. The drawings described are only schematic and are non-limiting.

In the drawings, the size of some of the elements may be exaggerated and not drawn to scale for illustrative purposes.

Definitions:

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

References to "time interval" can encompass for example a time instant with an interval implied by the level of time resolution, a time interval with defined endpoints, or a set of time intervals, periodic or otherwise, and there may be a changing traffic pattern such as changing bandwidth or priority over the time interval.

References to computing a path can encompass computing a route in terms of some or all of the links or intermediate nodes between endpoints of the path, or computing which time slots or frequency slots to use along a predetermined route, or computing multiple equal cost routes for a given path, for example, and can encompass computing without reserving the path resources, or computing with reservation of the selected path resources.

References to representation of availability can encompass a static value or a range, or a variable varying with time over a time interval.

References to path resource reservation can encompass making an entry in a database or other record of reservations, or informing the path resource, or controlling the path resource to enforce the reservation for example.

References to path resources can encompass any resources contributing to a path, and can encompass links, nodes, time slots, frequency slots, optical amplification or regeneration, protection or recovery resources and so on.

Reference to abstracted versions of path resources is intended to encompass versions simplified by removal of vendor specific or non standardized or non essential details for example.

Abbreviations
API Application Programming Interface
ASIC Application Specific Integrated Circuit
DWDM Dense Wavelength Division Multiplexing
FPGA Field Programmable Gate Array
LSP Label Switched Path
MPLS Multi Protocol Label Switching
NSM Network Service Manager
OTN Optical Transport Network
PCC Path Computation Client
PCE Path Computation Element
TP Temporal Pattern
SDN Software Defined Networking or Software Defined Network
WSON Wavelength Switched Optical Network Introduction By way of introduction to the embodiments, some issues with conventional designs will be explained, with reference to conventional software defined networks. Software Defined Networking (SDN) is an emerging architecture which decouples the network control and forwarding functions enabling the network control to become directly programmable and the underlying infrastructure to be abstracted for applications and network services. A direct consequence of this agility and programmability is the possibility of having applications running on top of a transport SDN controller which request new paths automatically without manual intervention, and carry out path computation. A problem with existing solutions is that the SDN controllers and the applications running on top of them are not aware of the temporal dimension but only of the paths, (for example LSPs or circuits) actually in place and of the resources actually available at the particular moment in time. This approach reflects the static nature of the transport networks. The embodiments described address this in a particular way, and are applicable not only to SDN networks or transport networks, but can apply when any type of PCC requests a path computation service of the PCE.

FIG. 1 Network View Showing PCE

FIG. 1 shows an example communications network (not necessarily SDN) in the form of an optical transmission network 2 with path resources such as nodes 8, 10, and optical transmission links 5 connecting the nodes. Traffic is carried on links 5 by frequency or wavelength channels 6, also called lambdas. Paths are set up in the network by reserving wavelength channels or time slots within a wavelength channel of a established between a pair (or more) of the nodes. A lightpath can pass via intermediate nodes. Each node has network interfaces for optically transmitting traffic on lambdas and for optically receiving traffic on lambdas. Each of the nodes connects to multiple links 5 and can comprise a flexible wavelength selective switch (WSS), e.g. a bandwidth-variable optical cross connect (BV-OXC). At a first node 10 for a given path, there is a Path Computation Client (PCC 21). Traffic is received at a network interface on a lambda of an ingress link 5, the traffic is forwarded to a required egress network interface, and is transmitted on a lambda of an egress link 5. A node 10 can forward traffic to other nodes 8 of network 2, or can add traffic received from other nodes not forming part of network 2, or drop traffic to other nodes not forming part of network 2.

The PCC 21 is coupled to a PCE 22. The PCC can submit a request to the PCE to compute a path. The PCE provides two main services to its PCC (which can be located at an ingress node, or be part of a network management system or part of the Network Service Manager, (NSM) for example). The first of these services is the path computation, where PCC asks for a new path (possibly in the future) and the PCE returns, if possible, an explicit route including all the selected path resources for that path. This is just a "read-only" operation as it does not affect the network status maintained used by the PCE. The second service is the ability to reserve a path, where the PCC asks the PCE to reserve (or release) a certain set of path resources (because actually owned by a routed path). For the case that the paths are LSPs, this is the so called "create LSP" (or "delete LSP") service.

The PCE 22 can be arranged to service requests from many PCCs. The PCE is arranged to compute a routing between end nodes and replies to the PCC with the selected path. The PCE carries out the computation depending on which path resources are available. This availability status is typically stored in a database such as a Traffic Engineering Database (TED) 23. The TED 23 can store information about spectrum resource availability (e.g. reservable frequency slots) to help the PCE select resources which are available. Information to verify the optical feasibility of a lightpath in an impairment aware PCE can also be stored in the TED 23, or in another database accessible by the PCE 22.

The PCE 22 can be implemented in a centralised form at a node of the network, or the functionality can be distributed among a plurality of nodes of the network or be virtualised to use a so called computing cloud. Similarly, the TED can be centralised or distributed. The PCE 22 can form part of the Network Management System (NMS). The PCC 21 can be located at a node 10, as shown in FIG. 1, or can be located at any part of the network 2.

Figure 2:
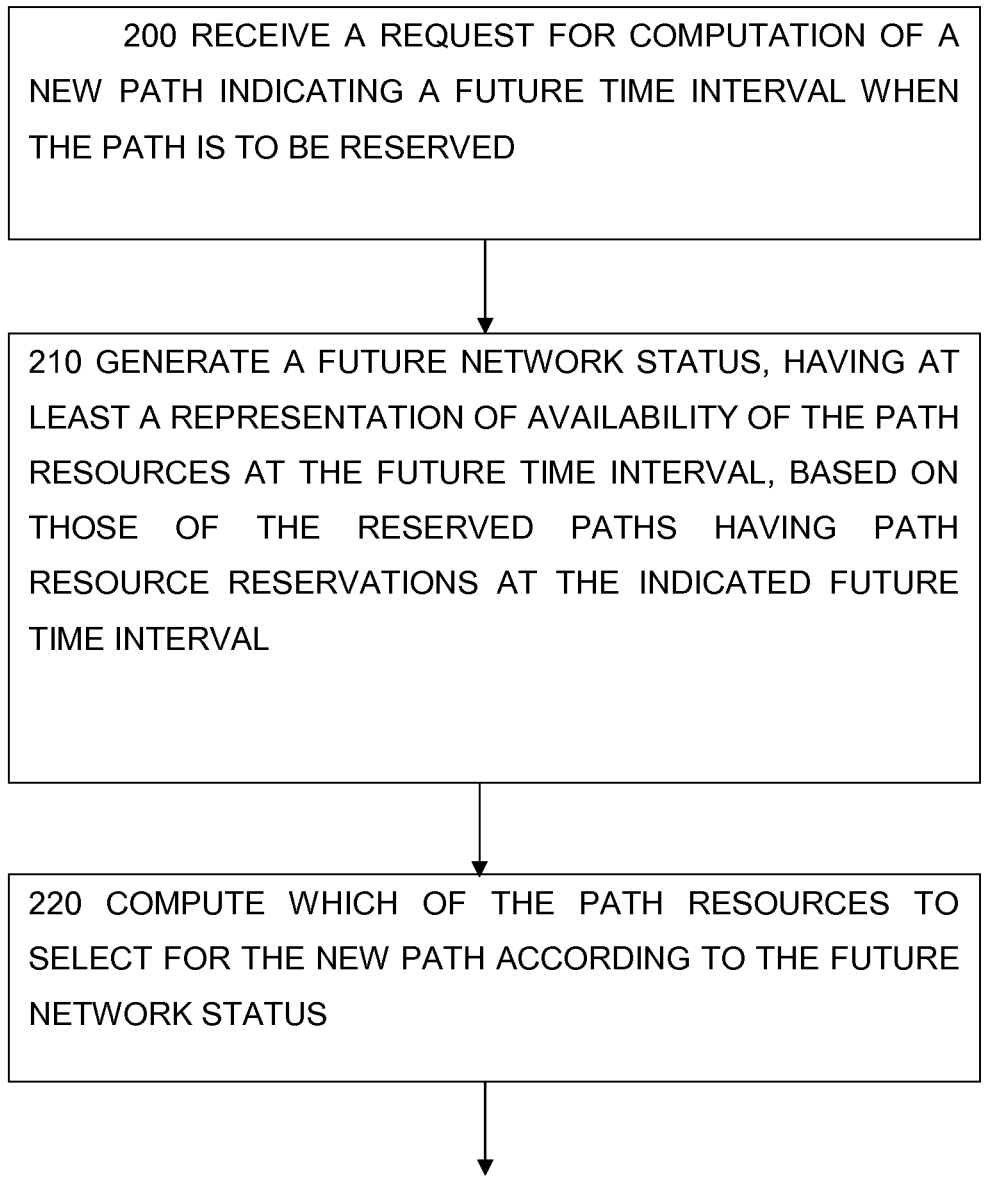
FIG. 2 shows method steps of path computation according to an embodiment.

FIG. 2, Path Computation According to an Embodiment

FIG. 2 shows flow chart showing an example of a path computation method for use in a communications network such as that shown in FIG. 1 or other types. The communications network has path resources 8, 10 usable for implementing paths. There is a step of receiving 200 a request for computation of a new path in the network, the request indicating a future time interval when the path is desired. Reference to a new path is not intended to imply that the route of the path is novel in some way, only to help clarify that this path is not one of those already requested. Subsequently there is a step 210 of generating a future network status, having at least a representation of availability of respective ones of the path resources at the future time interval, the generating step being based on a selection from a log of paths already reserved. The paths are represented in the log in terms of path resource reservations for each respective reserved path, at least some of the path resource reservations having an associated time interval. The selection includes those of the reserved paths having path resource reservations whose associated time interval corresponds to the future time interval.

Then there is a step of computing 220 which of the path resources to select for the new path according to the future network status. An example of time aware path computation is shown in an article "A Bandwidth Monitoring Mechanism Enhancing SNMP to Record Timed Resource Reservations" by Manousakis K, et al. Journal of Network and Systems Management, 20061206 Kluwer Academic Publishers-Plenum Publishers, Vol: 14, Nr: 4, Page(s): 583-597. This shows an MPLS network in which resources are only reserved for a time duration and link bandwidth availability is not a scalar parameter, but a function of time that records the future utilization of the link. The network management system searches for the first time instance where the quantity of available capacity in all the links down the path becomes positive.

By generating this future network status representing availability from the log of paths and when the future time interval is known, it can be generated in respect of a limited time interval rather than covering all possible future reservable times. Thus the benefits of time aware path computation can be achieved without the need for maintaining a huge database of availability at all future times, of all the path resources. This future network status can cover just a relevant slice of time and thus has a lower storage need, and the path computation can be simpler or closer to existing non time aware algorithms. Thus it can be more scaleable to larger networks and can provide an easier upgrade path from non time aware path computation. The representations of availabilities can be retained temporarily until the path computation is completed or retained longer. One or more different versions of the future network status can be generated for different future time intervals and can be retained for reference or as starting points for generating a subsequent future network status in response to a subsequent path computation request for a different future time. The representations of availability can be stored in any way, or incorporated with other information, for example within a traffic engineering database having topology information and other resource status information, or as a separate database for example. An example known from "Applicability of Stateful Path Computation Element (PCE)"; draft-zhang-pce-stateful-pce-app-00.txt, 20120305 Internet Engineering Task Force, IETF, shows maintaining a database of all the reserved information with a time reference, either as separate database or incorporated with a list of paths.

In some embodiments the paths are Label Switched Paths (LSPs), and there is information associated with the LSPs to record a time interval such as a temporal pattern TP for which they are requested. Various different ways to keep track of the temporal patterns are possible based on for example patterns associated with each resource (for example link/card) or associated with each path (for example LSP). Various different ways to process this information are described, for example by the PCC or by the PCE or both. There are various ways the temporal patterns could be encoded, for any of the embodiments, as would be apparent to those skilled in the art, and so this need not be described in detail. The temporal patterns can be recurring or one-time, the latter case being a simple subcase of the former case.

The future time interval can be encoded in any way, for example in an open form in a message from an application which wishes to send data across the network, to a path control function such as a PCC implemented by a Network Service Manager (NSM). The application does not need to know any detail about the temporal properties of the underlying physical network. It can request, and it can be answered with, a path computed in terms of path resources, and the path can be characterized in terms of a temporal pattern TP or it may be denied.

What happens to the resulting computed path after step 220 is not shown here as there are many possibilities. For example it could be returned to the PCC, which could decide the computed path is to be instantiated, or not, or the PCE could pass the computed path directly to the nodes bypassing the PCC, if the PCE is suitably connected to the nodes.

Figure 3:
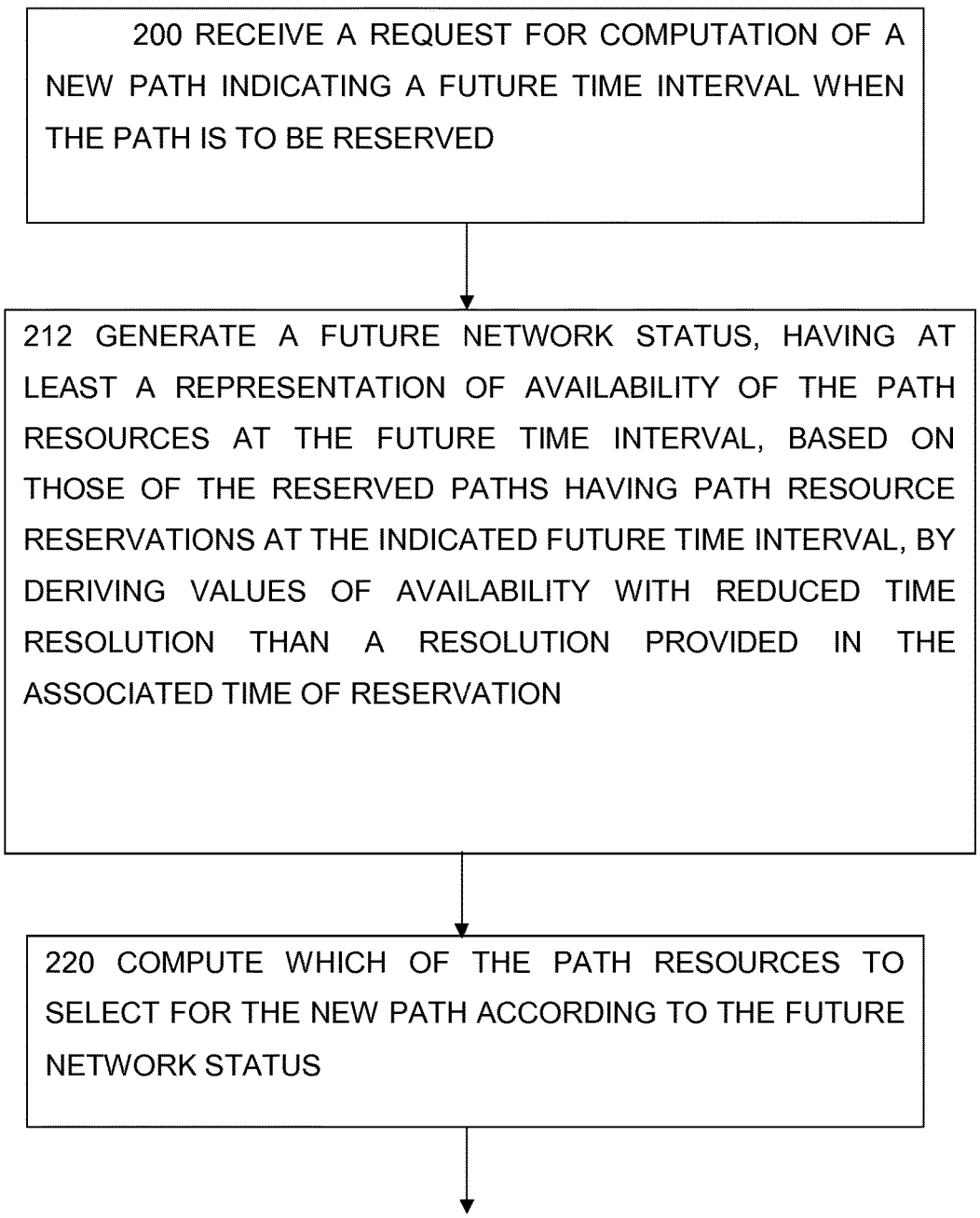
FIG. 3 shows path computation according to embodiment with reduced time resolution.

FIG. 3 Path Computation According to Embodiment with Reduced Time Resolution

FIG. 3 shows a flow chart showing an example of a path computation method similar to that of FIG. 2. As in FIG. 2 there is a step of receiving 200 a request for computation of a new path in the network, the request indicating a future time interval when the path is desired. Subsequently there is a step 212 of generating a future network status, having at least a representation of availability of respective ones of the path resources at the future time interval, the generating step being based on those of the paths already reserved having path reservations whose associated time interval corresponds to the indicated future time interval. The step of generating the future network status also involves deriving values of availability for respective ones of the path resources with reduced time resolution than a resolution provided in the associated time of resource reservation in the log. As in FIG. 2 there is a step of computing 220 which of the path resources to select for the new path according to the future network status.

This reduced time resolution can help enable the future network status to have less time information, which further helps simplify the path computation, and can help reduce the storage needs of the future network status. The reduced resolution can be at a level corresponding to the resolution needed for the path computation, based on the indication of the future time interval for example. This simplification is feasible partly because the resource status is generated on demand.

The reduced time resolution can be implemented in various ways, for example by taking the minimum available bandwidth during a more coarse time interval such as hours instead of minutes or seconds. This can mean that memory usage is reduced and also path computation is simplified. A disadvantage is that the solution found is not always optimal.

Figure 4:
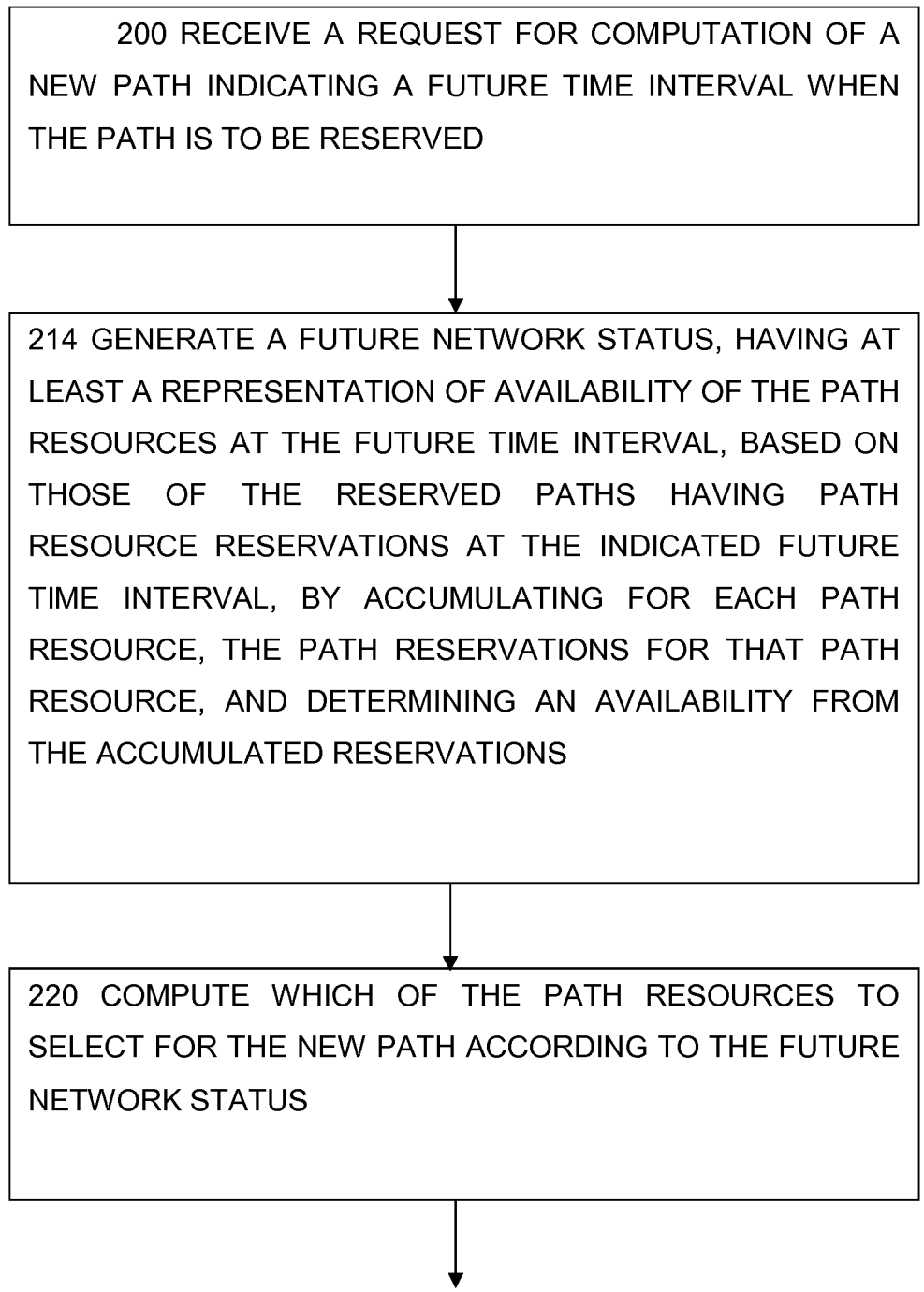
FIG. 4 shows path computation with accumulation of reservations for each resource.

FIG. 4, Path Computation with Accumulation of Reservations for Each Resource

FIG. 4 shows a flow chart showing an example of a path computation method similar to that of FIG. 2. As in FIG. 2 there is a step of receiving 200 a request for computation of a new path in the network, the request indicating a future time interval when the path is desired. Subsequently there is a step 214 of generating a future network status, having at least a representation of availability of respective ones of the path resources at the future time interval, the generating step being based on those of the paths already reserved having path reservations whose associated time interval corresponds to the indicated future time interval. The step of generating the future network status also involves accumulating for each path resource the reservations for that path resource and determining availability from the accumulated reservations. This way of generating the future network status has the benefit of providing a more accurate deterministic representation than algorithmic predictions for example.

Figure 5:
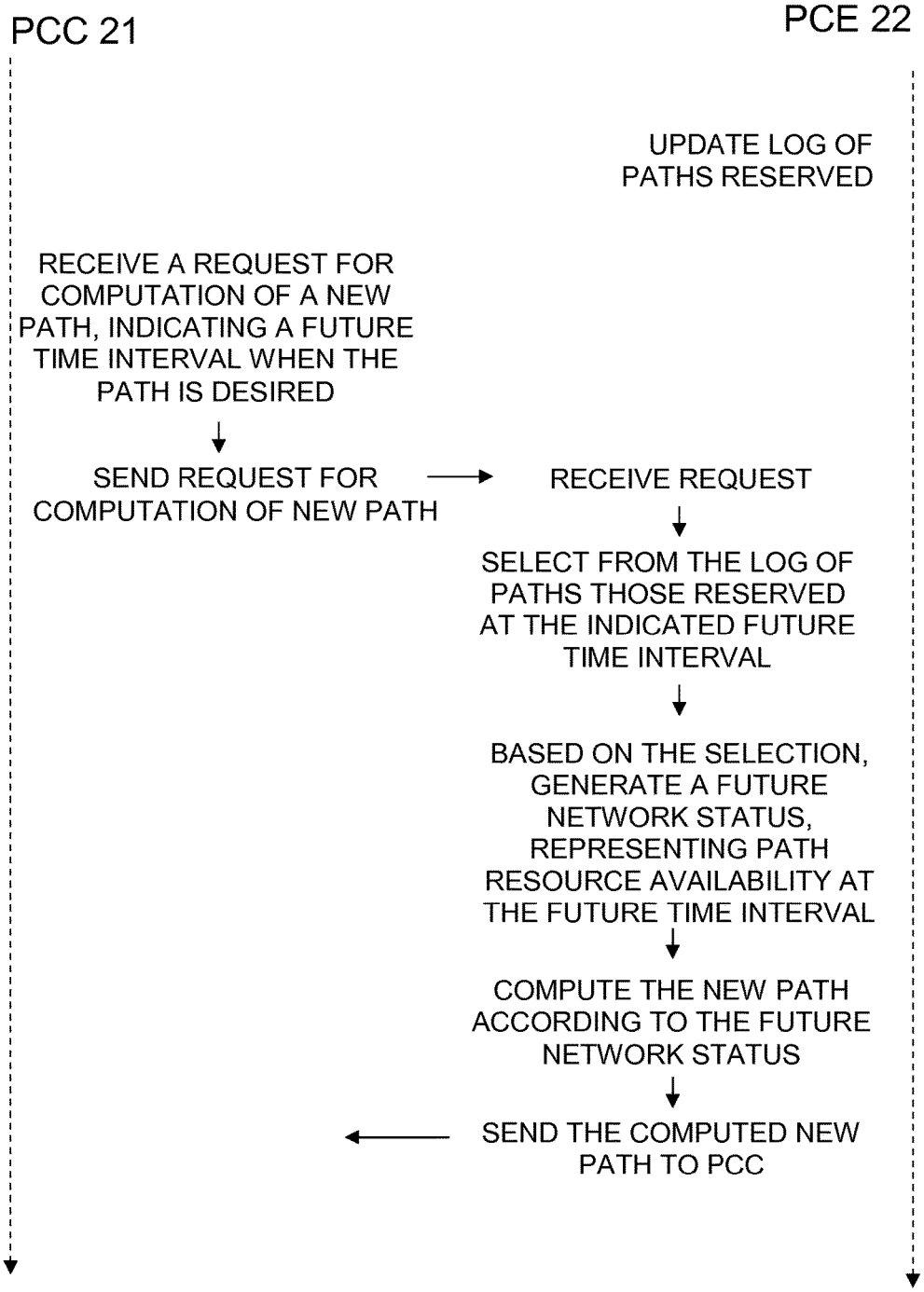
FIG. 5 shows a time chart of actions of a PCC and a PCE according to an embodiment.

FIG. 5, Embodiment Using PCE

FIG. 5 shows a time chart showing actions of a PCC and a PCE according to an embodiment. Time flows down the figure. Actions of the PCC are shown at the left side. Actions of the PCE are shown at the right side. This embodiment is illustrated to show a step of selecting from the log the reserved paths having path resource reservations at the future time interval by a PCE 22, and to show the steps of generating the future network status and of computing the new path are also carried out by the PCE 22. This can help reduce a communications overhead which would be incurred if the selection of paths is carried out elsewhere.

This figure also illustrates a step of updating the log of paths already reserved, being carried out by the PCE. This enables the PCE to be more autonomous and thus helps keep the communication overhead lower than if the log is maintained elsewhere.

The other steps are similar to those illustrated in earlier figures. The PCC receives a request for computation of a new path. This can come from a client or from an application layer program for managing automatically new traffic demands for example. The request indicates a future time interval when the path is desired. This is sent on to the PCE which upon receipt, selects from the log of paths already reserved, any paths reserved at the indicated future time interval. Based on the selection, the PCE generates a future network status representing the path resource availability at the future time interval. The PCE is then able to compute which resources to select for the new path from this future network status. As described above, this future network status represents only a limited subset of all reservable times, avoiding the need to determine the availability at all future times. The computed path can if desired in some cases be sent direct to the path resources to instantiate the path. Or the computed path may be returned to the client to carry out further processing or negotiation or decide whether to proceed with the computed path.

Figure 6:
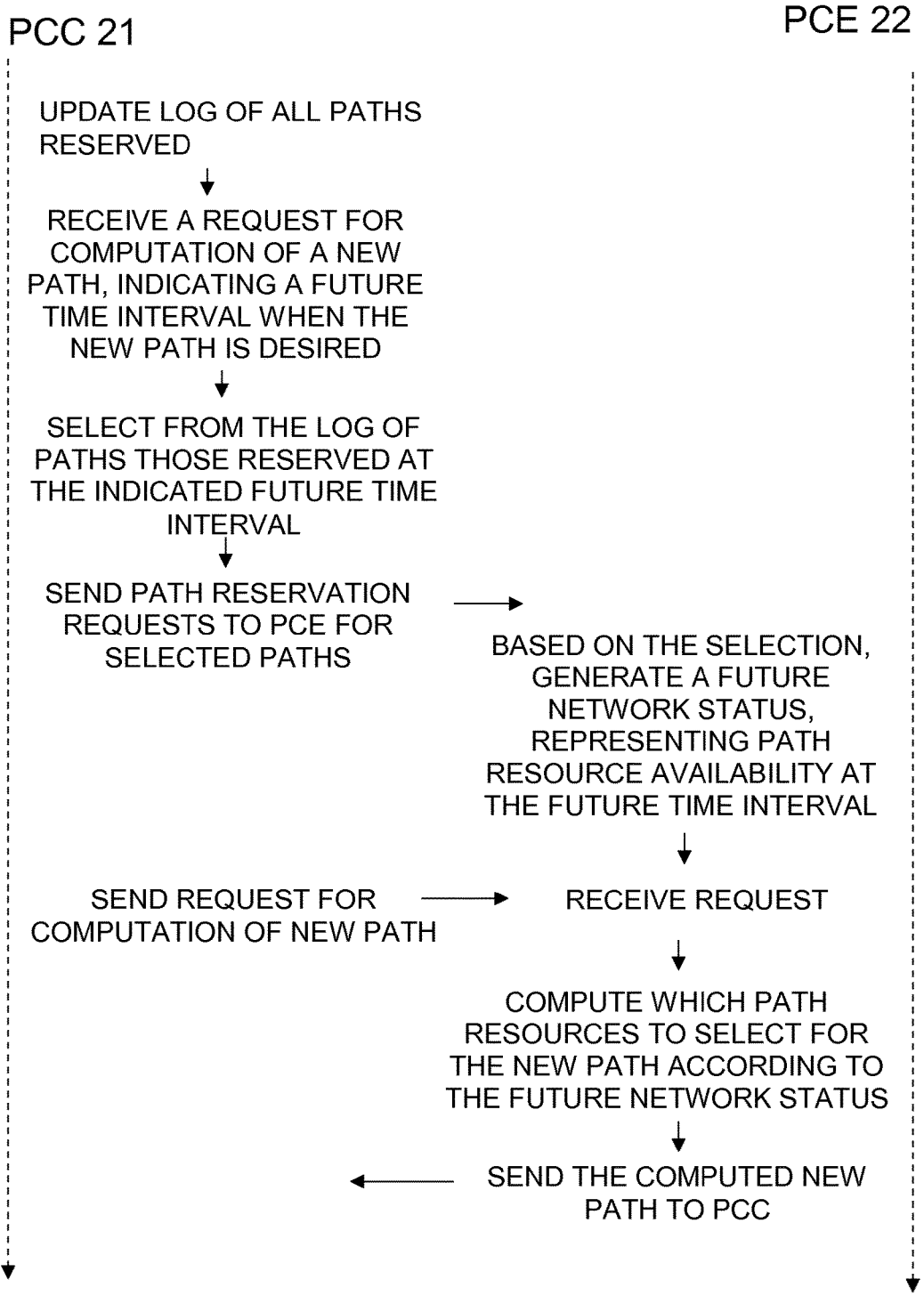
FIG. 6 shows a time chart with PCC used to select the paths used to generate the status.

FIG. 6, Embodiment Using a PCC to Select the Paths Used to Generate the Status

FIG. 6 shows a time chart similar to that of FIG. 5. In this case it differs from FIG. 5 in that a path computation client (PCC) is used to select the paths in the log which have path resource reservations at the future time interval, and to send path reservation requests for the selected paths to a PCE 22. This enables the PCE 22 to carry out the step of generating the future network status at the future time interval, and the PCE is configured to carry out the step of computing the new path. By having the selecting and sending of path reservation requests carried out external to the PCE, this can enable the PCE to be controlled to carry out time aware path computation without it needing to be time aware itself. Thus the PCE can be simpler or more similar to legacy equipment, yet still enable the time aware path computation, though at the cost of a higher communication overhead.

The other steps are similar to those illustrated in earlier figures. The PCC receives a request for computation of the new path. The request indicates a future time interval when the path is desired. Before this is sent on to the PCE, the PCC selects from the log of paths already reserved, any paths reserved at the indicated future time interval. Based on the selection, the PCC sends path reservation requests to the PCE to enable the PCE to generate a future network status representing the path resource availability at the future time interval. The PCE is then able to compute which resources to select for the new path from this future network status.

Figure 7:
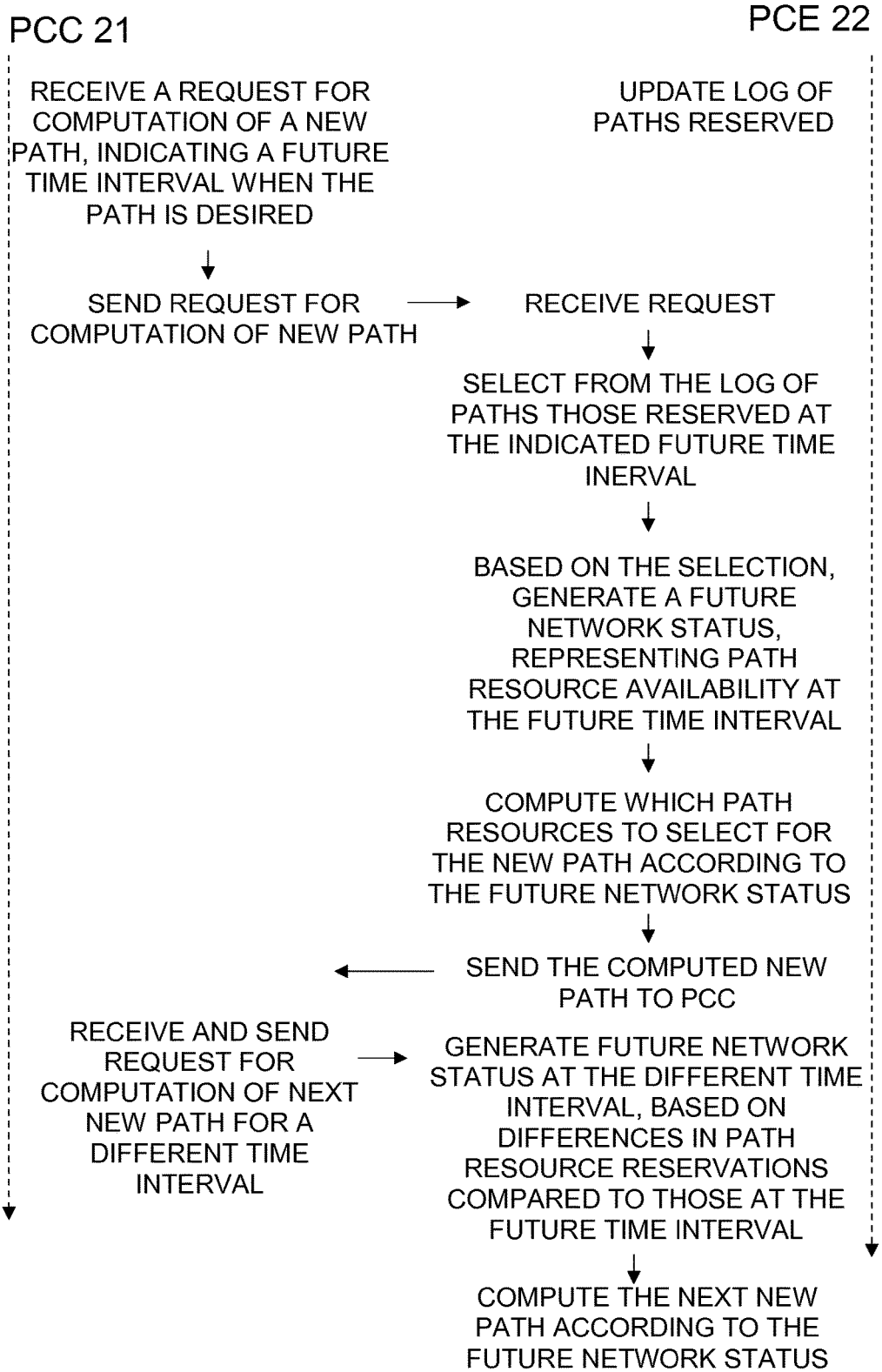
FIG. 7 shows an embodiment involving generating future network status for a different time interval.

FIG. 7, Embodiment Involving Generating Future Network Status for a Different Time Interval FIG. 7 shows a time chart similar to that of FIG. 5. In this case it differs from FIG. 5 in that there is a subsequent step of generating a future network status for a different time interval, by detecting, from the log, differences in path resource reservations compared to those at the future time interval, and making corresponding changes to the representation of availability of respective ones of the path resources according to the differences. This can help process subsequent requests more efficiently compared to always resetting the network status to the present time after each path computation. This can of course be applied to other embodiments such as that of FIG. 6.

Figure 8:
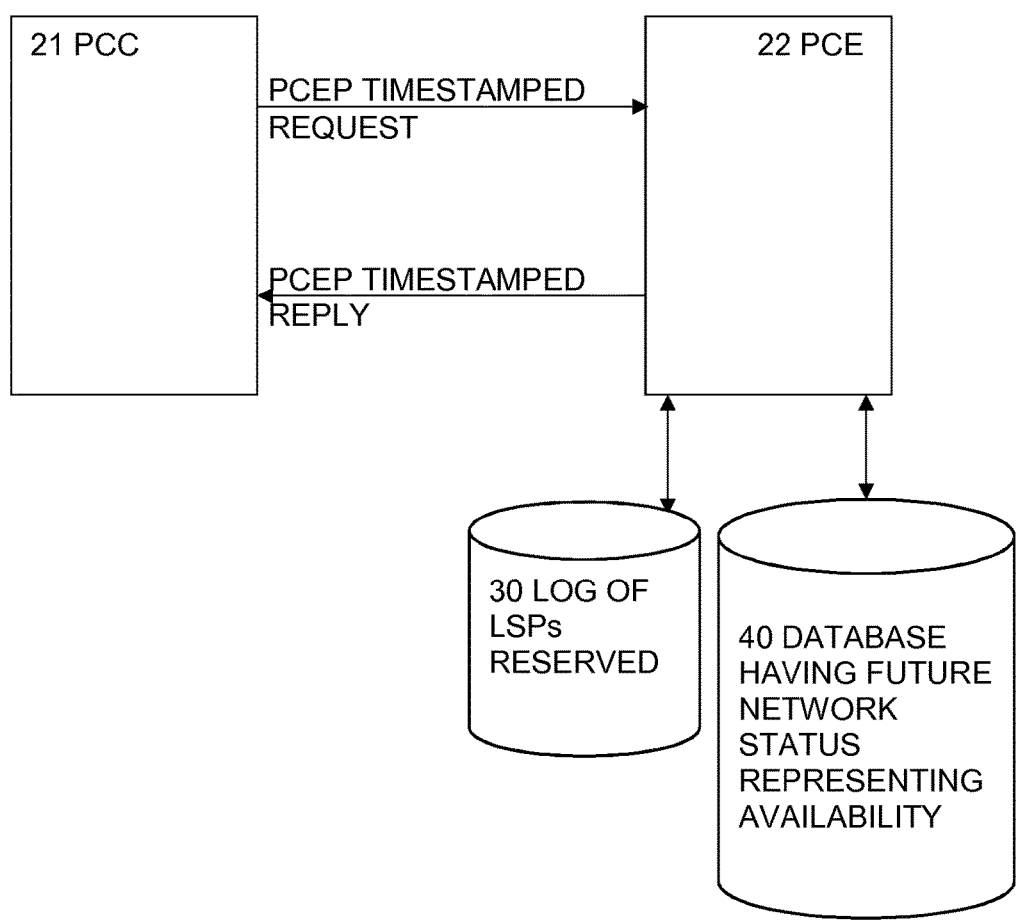
FIG. 8 shows an embodiment having a PCC and a PCE.

FIG. 8, Embodiment Having PCC and PCE

FIG. 8 shows a schematic view of an embodiment having a PCC and a PCE, and showing interactions between them, similar to the embodiment of FIG. 5.

The paths are label switched paths in this case, as these are currently commercially widely used and significant. In the embodiment of FIG. 8, the PCE 22 maintains a log 30 of already reserved paths in the form of LSPs with their current temporal demand. A store such as database 40 is also provided for the PCE to store the network status to enable it to carry out path computation. Communication between the PCC and PCE is shown in time sequence with time flowing down the figure. The PCC and PCE may communicate through the PCE communication Protocol (PCEP). When the PCC 21 sends a request for a new LSP associated to a temporal pattern TP, the PCE makes two steps. First it performs "create LSP" actions for all the LSPs in the log having an associated time interval overlapping with the associated time interval of the new path request. This enables the PCE to update the network status in database 40 to represent the status at the future time. This reflects the forecasted demands at the requested future time interval shown by the reserved paths.

Then the PCE performs the usual path computation in the spatial dimension only using the future network status. After the reply, the PCE optionally performs all "delete LSP" actions to revert the network status in the database 40 back to the current status. An effect of this embodiment is that the PCE can be made time aware without changing its database to store the status at all reservable future times, and thus without needing to complicate the path computation to search fully in the time dimension.

According to embodiments, the PCC may request a path defined in terms of a temporal pattern TP and the PCE may calculate the available path exploring the spatial dimension in a database having the network status at the desired future time interval. In other words if a LSP is requested for a given time interval (e.g. from T1 to T2) in the future (T1>T0 actual time), the PCE must be able to have a view of how the network will look like between T1 and T2. It is not possible to foresee faults happening in the future but it is possible to determine which path resources will be available and which ones will not, based on paths already reserved. Even if T1 is the current time the PCC can take into account the end time T2 to avoid conflicts with previous requests that have been reserved and will start before T2.

The future network status is determined from the log of paths already reserved. This log of paths already reserved may be maintained with various levels of detail. In one case it can be a set of tuples including information such as details of the traffic demand, start date, duration and recurring period (if any). In order to simplify the management of this information, an approximate representation including a lower number of tuples can be provided according to some policy. For example it can have a reduced time resolution, for instance by taking the minimum available bandwidth during a more coarse time interval such as hours instead of minutes or seconds. This can mean that memory usage is reduced and also path computation is simplified, as there is less status information to explore. A disadvantage is that the solution found may be less optimal.

Figure 9:
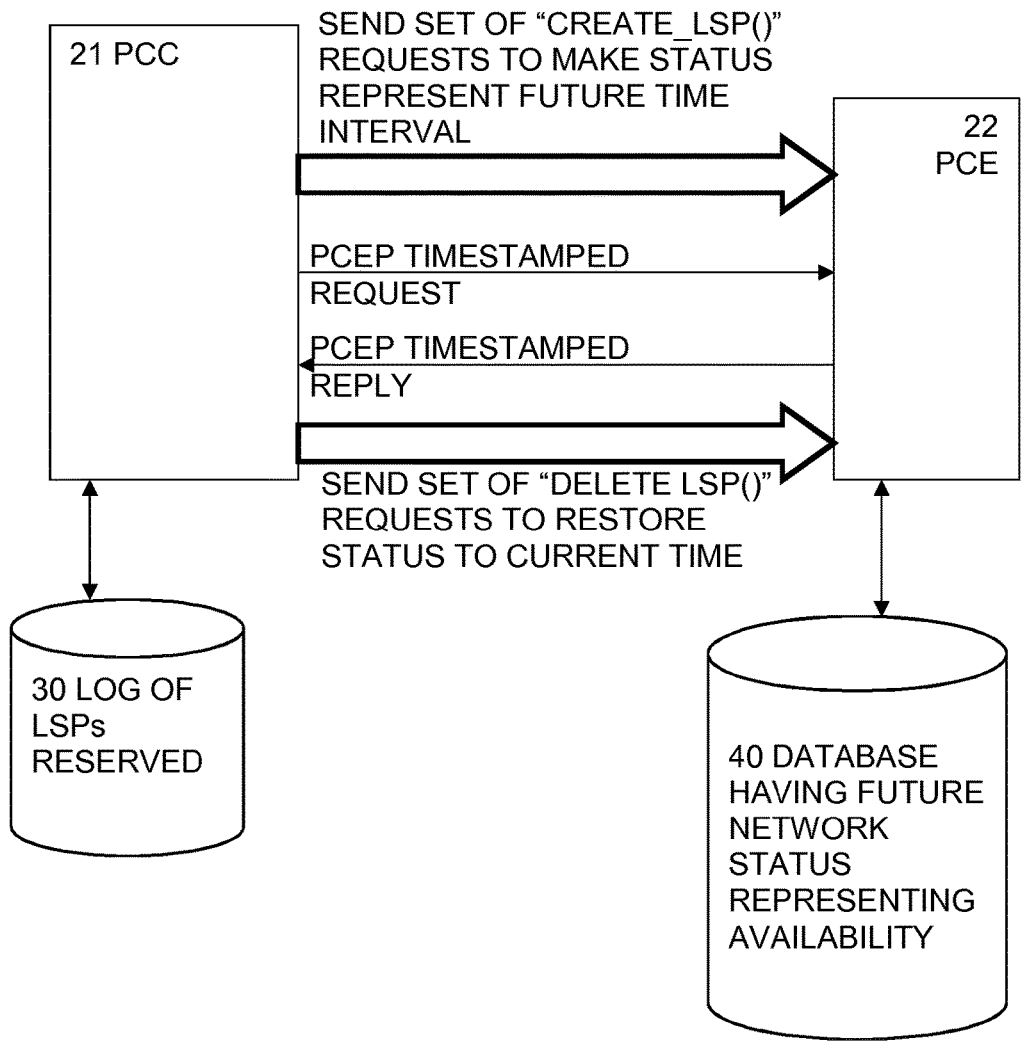
FIG. 9 shows an embodiment having a PCC select paths used to generate the status.

FIG. 9, Embodiment Having PCC Select from Log

FIG. 9 shows a schematic view similar to that of FIG. 8. In this case the log is maintained and updated by the PCC. In the embodiment of FIG. 9, the PCC owns the log and provides the PCE with all the "create LSP" and "delete LSP" path reservation requests seen in the embodiment of FIG. 8, using the same logic. The advantage is that the PCE can remain completely time-unaware and all time related logic is moved to the PCC or to the client application. A disadvantage is that the exchanged information between the PCC and the PCE can be bulky. Optimizations in terms of the calculations of the repeated occurrences of the TP can be made in various ways evident to those skilled in the field.

Before the PCC 21 asks for a new LSP associated to a temporal pattern TP, the PCC first selects paths from the log having path resource reservations at the future time interval. The PCC sends path reservation requests to the PCE in the form of "create LSP" actions for all the LSPs in the log having an associated time interval overlapping with the indicated future time interval. This enables the PCE to update the network status in database 40 to represent the status at the future time interval. This reflects the forecasted demands at the requested future time interval shown by the reserved paths. Then the PCE performs the usual path computation in the spatial dimension only using the future network status, and sends the computed path to the PCC as a PCEP timestamped reply. After the reply, the PCC optionally sends "delete LSP" actions to the PCE to enable it to revert the network status in the database 40 back to the current status.

Figure 10:
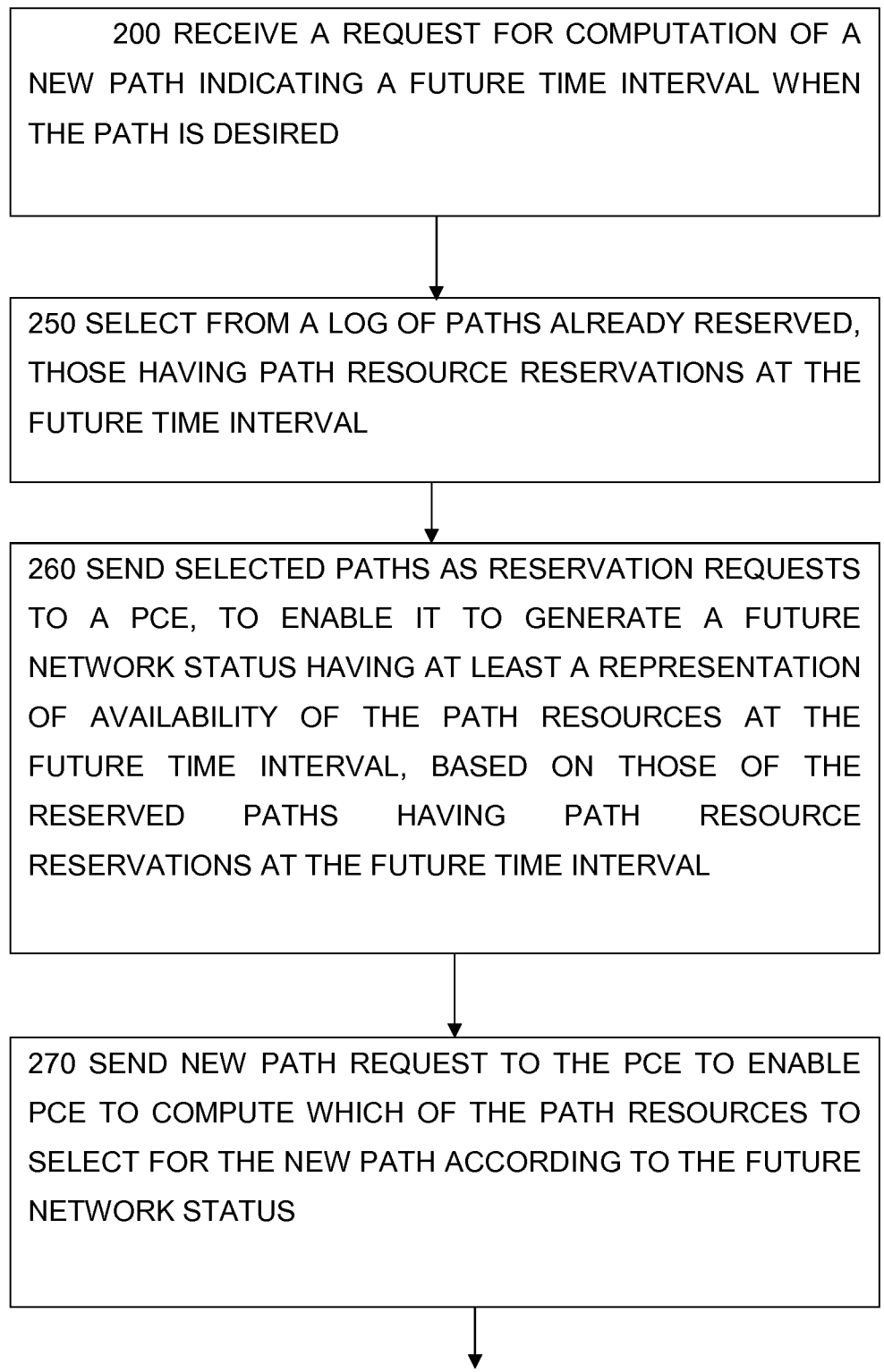
FIG. 10 shows an embodiment showing PCC actions.

FIG. 10, Embodiment Showing Actions of PCC

FIG. 10 shows a flow chart of steps according to an embodiment from the view of functions of a path computation client. At step 200 a request for computation of a new path in the network is received, the request indicating a future time interval when the path is desired. At step 250, there is a selection from a log 30 of paths already reserved represented in terms of path resource reservations for each respective reserved path, at least some of the path resource reservations having an associated time interval. The selection comprises at least those of the reserved paths having path resource reservations whose associated time interval corresponds to the future time interval. Step 260 involves sending the selected paths as reservation requests to a path computation element, to enable the PCE to generate a future network status at the future time interval having at least a representation of availability of the path resources at the future time interval.

Subsequently step 270 involves sending the new path request to the PCE to enable it to compute which path resources to select for the new path according to the future network status. This embodiment corresponds to the left side of FIG. 6, and the actions of the PCC in FIG. 9, and is notable for the selection of the paths already reserved.

Figure 11:
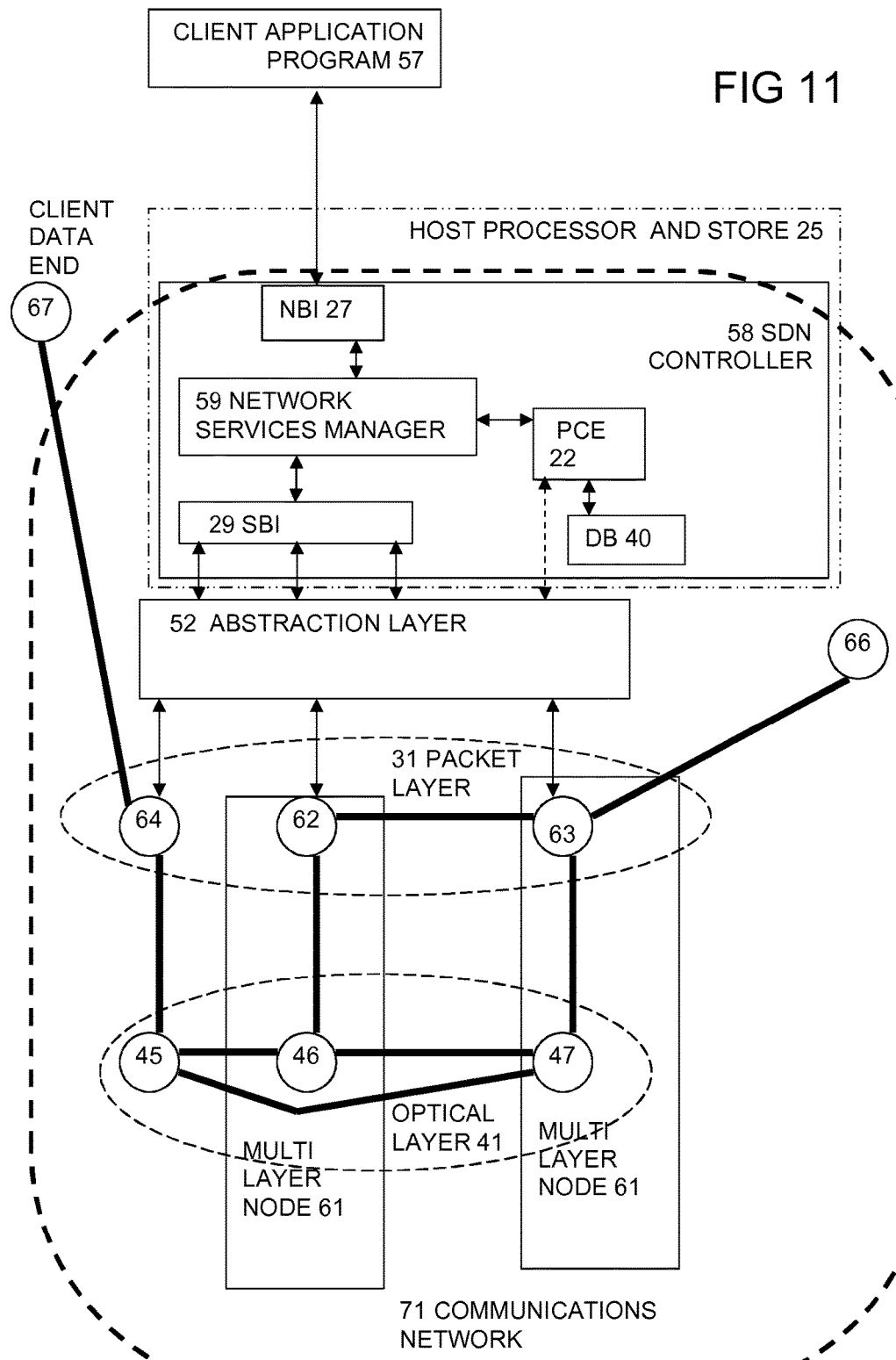
FIG. 11 shows an embodiment having an SDN controller.

FIG. 11, Embodiment Showing SDN Controller

FIG. 11 shows an embodiment in which the network has a software defined network controller 58 which is configured to carry out the steps of receiving the request, subsequently generating the future network status, and computing the new path. This embodiment is also notable for the path resources being represented as abstracted versions of actual path resources. This abstraction enables a control layer to be decoupled from a data or forwarding layer of the network. This helps enable applications to control network provisioning automatically to suit time varying traffic demand without needing to know too much detail of the data or forwarding layer. It can be implemented in combination with features of any of the embodiments described above. FIG. 11 shows the SDN controller is coupled to the path resources such as the packet layer 31 and optical layer 41 via an abstraction layer 52. This abstraction layer can be implemented by agent software at each node of the network for example, to enable the NSM to control or access the path resource, though other implementations are possible.

The embodiment of FIG. 11 also serves to illustrate an example of the hardware in the form of host processor and store 25, used to store and run programs for carrying out these steps. This host processor and store can be implemented as a server cluster, or as virtualised machines in a computing cloud for example, as would be known to those skilled in the art. A client application program 57 is shown, which can be run on the same hardware, or separately at a client's location for example. This is a source of requests for new paths for traffic across the communications network.

SDN Controller of FIG. 11

The SDN controller has a number of functions, one of which is a network services manager NSM 59 for managing the network and for carrying out functions of the PCC described above. Another function is the PCE 22 shown within the SDN controller and coupled to the NSM, and to a database 40 for storing the future network status. A log of paths already reserved can be provided (not shown for the sake of clarity) either coupled to the NSM or to the PCE, as in embodiments described above. The SDN controller also has a southbound interface SBI 29 for coupling the NSM to the nodes of the network via the abstraction layer 52. A northbound interface NBI 27 is provided to couple the NSM to client application programs, so as to provide an abstracted, standardised interface to enable the client application programs to control the network via the NSM to undertake path computation for new traffic requests. Path computation can be carried out as described in other embodiments above and used either for path provisioning during network operation, or during network design before installation, or for determining how best to upgrade the network by providing new capacity for example. If the path computation is carried out externally to the ingress node, then the requesting entity or the ingress node needs to pass all the necessary information to the external part.

Communications Network of FIG. 11

The communications network 71 in this case has a number of switching nodes in an electrical domain packet layer 31 and an optical layer 41. The control plane is coupled to switching nodes which can be in the packet layer 31 or the optical layer 41. Some nodes can be hybrid nodes also called multilayer nodes 61, having switching in both layers. A number of links between nodes are shown, a typical network would have many more. A client data end point 67 outside the network could be an interface from a corporate intranet, or a user terminal for example, requesting traffic from a traffic source such as a remote server. The request can be managed by the NSM, and typically in cooperation with the ingress node, in this case switch 64. There are a number of possible paths between the source 67 and the destination 66, passing through packet switches 64, 62 and 63, and optical switches 45, 46 and 47. The path computation can be extended to cover the packet layer and cover more than two layers for example.

The multilayer nodes can for example be implemented by a Packet-Opto hybrid node that performs adaptation between MPLS-TP (MPLS Transport Profile) technology (i.e. Packet Switching Capability PSC layer) and WSON (i.e. Lambda Switching Capability LSC layer). The Packet-Opto node is a hybrid node composed by a double switching capability, that is, a Packet Switching Capability (PSC) and Lambda Switching Capability (LSC). The optical layer LSC can be constituted by an OEO ROADM (Optical-Electrical-Optical Regen-Optical-Add-Drop-Multiplexer), in which the routing of the wavelength signals coming from the transport network is performed, without any limitation due to physical impairments. Thanks to the OEO conversion, the node can be considered to be both colorless and directionless. A controller for the node can be implemented by a conventional processor and appropriate software.

Path Computation in FIG. 11

In conventional non time aware implementations the application asks the Network Service Manager (NSM) via its northbound Application Programming Interface (API) for a network resource when it needs it and not for a future time interval. The NSM is the functional block of the SDN controller which implements the northbound API, which keeps track of the finite state machines of the LSPs and that interacts with any other block of the SDN controller, like the PCE. The NSM asks the PCE for the feasible paths which are returned, if any. The PCE reply is based on the current state of reserved and used resources and this state is taken to be immutable from now for all times (or until the next LSP creation or change of topology). In time aware operation according to embodiments, the NSM and PCE can generate and update a future network status which can use abstracted versions of the path resources such as modeled traffic aggregation, and representations of each port or sub-port and so on. Also, current information on available capacity and costs can be assigned to each link. This can involve finding information from the nodes, or predetermined or predicted information can be assigned. There can be weighting of links according to congestion level and other criteria.

A path request may have a specified bandwidth and quality of service for example, and then it may be appropriate to allow only links which have at least that bandwidth and quality of service available. The quality of service might be expressed in terms of reliability, availability of recovery by protection or restoration, delay parameters such as maximum delay or delay variation, and so on. The topology or graph of the network in the status can be simplified in various ways, the temporal information may be simplified, and then a graph search algorithm such as Dijkstra or other known algorithm can be applied to compare the costs of alternative links to find a lowest cost path to nodes successively further away from a starting node, until the destination node is reached. Other algorithms can include peer to peer type routing algorithms for example.

The selected lowest cost path through the virtual links of the model, is converted into a path list representing path resources in abstracted terms. This path can now be set up in the network, for example by sending the path information to the ingress node for it to send messages along the path if using the known RSVP protocol. This can involve sending a first message to the nodes requesting they reserve resources, and then a second message is returned from the egress node requesting the reserved resources be used to set up the path. Of course this can be implemented in other ways using other protocols. This can be controlled by the NSM or can be delegated to the PCE if there is a link provided directly from the PCE to the abstraction layer 52 as shown by a dotted line in FIG. 11. This has been described in and IETF draft "PCEP Extensions for PCE-initiated LSP Setup in a Stateful PCE Model" (draft-ietf-pce-pce-initiated-lsp-02) which describes extensions for stateful PCE that provide stateful control of Multiprotocol Label Switching (MPLS) Traffic Engineering Label Switched Paths (TE LSP) via PCEP, for a model where the PCC delegates control over one or more locally configured LSPs to the PCE. This describes the creation and deletion of PCE-initiated LSPs under the stateful PCE model.

Client Applications in FIG. 11

Examples of time aware applications which are emerging include the following. One kind of application is usually called "Bandwidth Calendaring" where the request for connectivity can either follow some temporal pattern (e.g. daily or weekly) or be just limited in time (e.g. from March 1st to March 31st). An example is to configure transport links to provide more bandwidth when some massive operations must be done, for example a datacenter's regular data backups.

Another kind of time-aware application is called "Follow the Sun" where transport SDN will help an organization to manage traffic fluctuations due to the Earth rotation and related human activities. This is attractive for transport networks spanning vast geographical areas where working times are related to the time zones.

Other examples of time-aware applications are related to efficient power management, e.g. by using network resources close to advantageous power sources like solar-powered ones or to the exploitation of the most cost-effective tariffs (just like running the washing machine when the bill is cheaper). Another example of a time-aware application is the reservation of bandwidth for events involving massive participation that will take place in the future.

Other Features of SDN

In some of the embodiments relating to SDN, there can be an interoperable mechanism and a clear administrative boundary between the application layer and the transport SDN layer which is just enriched with the temporal dimension. The time-aware transport SDN functionality can be advantageously packaged as an add-on and offered at a premium cost with respect to the time-unaware basic functionality which typically comes with any transport SDN implementation. Some of the embodiments can applicable to multi-layer transport networks comprising DWDM/OTN/IP/MPLS technologies etc. The path computation step can be enhanced with simplifications such as topology reduction. Some SDN embodiments can have an SDN controller employing a plurality of PCEs sharing the same network. Multiple PCEs typically have some type of synchronization between them to avoid conflicting paths being computed, which can be implemented as known by those skilled in the art. Other embodiments can be envisaged within the claims.

The invention claimed is:

1. A path computation method for use in a communications network having path resources usable for implementing paths, the method having steps of:
   receiving a request for computation of a new path in the network, the request indicating a future time interval when the new path is desired;
   selecting paths in a log which have path resource reservations at the future time interval;
   sending Path reservation requests for the selected path;
   subsequently generating a future network status at the future time interval based on the selected paths, having at least a representation of availability of respective ones of the path resources at the future time interval, the generating step being based on a selection from a log of paths already reserved, represented in terms of path resource reservations for each respective reserved path, at least some of the path resource reservations having an associated time interval, and the selection comprising at least those of the reserved paths whose associated time interval corresponds to the future time interval; and computing which of the path resources to select for the new path according to the future network status.

2. The method of claim 1, the step of generating the future network status having the step of deriving values of availability for respective ones of the path resources with reduced time resolution than a resolution provided in the associated time of resource reservation in the log.

3. The method of claim 1, the generating step having the step of accumulating for each path resource the reservations in respect of that path resource, from the selected paths, and determining an availability from the accumulated reservations.

4. The method of claim 1, having a step of selecting from the log the reserved paths having path resource reservations at the future time interval by a path computation element, the step of generating the future network status and the step of computing the new path also being carried out by the path computation element.

5. The method of claim 4, having a step of updating the log of paths already reserved, and carried out by the path computation element.

6. The method of claim 1, having a step of using a path computation client to select the paths in the log which have path resource reservations at the future time interval, and to send path reservation requests for the selected paths to a path computation element, to enable the path computation element to carry out the step of generating the future network status at the future time interval, and the path computation element being configured to carry out the step of computing the new path.

7. The method of claim 1, having the subsequent step of generating a future network status for a different time interval, different from the future time interval, by detecting, from the log, differences in path resource reservations compared to those at the future time interval, and making corresponding changes to the representation of availability of respective ones of the path resources according to the differences.

8. The method of claim 1, the paths being label switched paths.

9. The method of claim 1, the network having a software defined network controller, the steps of receiving the request, subsequently generating the future network status, and computing the new path being carried out by the software defined network controller, with the path resources being represented as abstracted versions of actual path resources.

10. A path computation method for use in a communications network having path resources usable for implementing paths, the method having steps of:
  receiving a request for computation of a new path in the network, the request indicating a future time interval when the path is desired,
  making a selection from a log of paths already reserved represented in terms of path resource reservations for each respective reserved path, at least some of the path resource reservations having an associated time interval, and the selection comprising at least those of the reserved paths whose associated time interval corresponds to the future time interval,
  sending the selected paths as reservation requests to a path computation element, to enable the path computation element to generate a future network status at the future time interval having at least a representation of availability of the path resources at the future time interval, and
  sending the request to the path computation element to enable the path computation element to compute which path resources to select for the new path according to the future network status.

11. Apparatus for path computation in a communications network having path resources usable for implementing paths, the apparatus having:
  an interface arranged to receive a request for computation of a new path in the network, the request indicating a future time interval when the new path is desired; and
  a processor configured to:
    select paths in a log which have path resource reservations at the future time interval;
    send path reservation requests for the selected paths; and
    generate a future network status at the future time interval based on the selected paths, having at least a representation of availability of respective ones of the path resources at the future time interval, the generating being based on a selection from a log of paths already reserved represented in terms of path resource reservations for each respective reserved path, at least some of the path resource reservations having an associated time interval, and the selection comprising at least those of the reserved paths whose associated time interval corresponds to the future time interval, and
  the processor being configured to compute which of the path resources to select for the new path according to the future network status.

12. The apparatus of claim 11, the processor comprising a path computation element also being configured to select from the log the reserved paths having path resource reservations at the indicated future time interval.

13. The apparatus of claim 12, wherein the path computation element is being arranged to update the log of paths already reserved.

14. Apparatus for path computation in a communications network having path resources for implementing paths, the apparatus having:
  an interface for receiving a request for computation of a new path in the network, the request indicating a future time interval when the path is desired; and
  a processor configured to:
    make a selection from a log of paths already reserved represented in terms of path resource reservations for each respective reserved path, at least some of the path resource reservations having an associated time interval, and the selection comprising at least those of the reserved paths whose associated time interval corresponds to the future time interval, and
    to send the selected paths as reservation requests to a path computation element, to enable the path computation element to generate a future network status at the future time interval, and
  the processor being configured to send the request to the path computation element to enable it to compute which path resources to select for the new path.

15. A non transitory machine readable medium having instructions stored thereon which when executed by a processor cause the processor to carry out a path computation method as set out in claim 1.

* * * * *

UNITED STATES PATENT AND TRADEMARK OFFICE
CERTIFICATE OF CORRECTION

PATENT NO. : 10,476,756 B2
APPLICATION NO. : 15/546541
DATED : November 12, 2019
INVENTOR(S) : Bruno et al.

Page 1 of 1

It is certified that error appears in the above-identified patent and that said Letters Patent is hereby corrected as shown below:

In the Specification

In Column 5, Line 55, delete "a established" and insert -- a lightpath established --, therefor.

In Column 13, Lines 62-63, delete "(MPLS) Traffic" and insert -- (MPLS), Traffic --, therefor.

In the Claims

In Column 14, Line 55, in Claim 1, delete "Path" and insert -- path --, therefor.

In Column 14, Line 55, in Claim 1, delete "path;" and insert -- paths; --, therefor.

Signed and Sealed this
Eighteenth Day of August, 2020

Andrei Iancu
*Director of the United States Patent and Trademark Office*